(12) United States Patent
Tsukamoto

(10) Patent No.: US 10,384,630 B2
(45) Date of Patent: Aug. 20, 2019

(54) SEAT SLIDING MECHANISM

(71) Applicant: TS TECH CO., LTD., Asaka-shi, Saitama (JP)

(72) Inventor: Masaru Tsukamoto, Shioya-gun (JP)

(73) Assignee: TS TECH CO., LTD., Asaka-shi (JP)

( * ) Notice: Subject to any disclaimer, the term of this patent is extended or adjusted under 35 U.S.C. 154(b) by 0 days.

(21) Appl. No.: 15/283,973

(22) Filed: Oct. 3, 2016

(65) Prior Publication Data

US 2017/0096081 A1 Apr. 6, 2017

Related U.S. Application Data

(60) Provisional application No. 62/236,449, filed on Oct. 2, 2015.

(51) Int. Cl.
*B60R 21/015* (2006.01)
*B60N 2/07* (2006.01)
*B60N 2/02* (2006.01)

(52) U.S. Cl.
CPC ...... *B60R 21/01554* (2014.10); *B60N 2/0705* (2013.01); *B60N 2/0715* (2013.01); *B60N 2/07* (2013.01); *B60N 2/0702* (2013.01); *B60N 2/072* (2013.01); *B60N 2002/0272* (2013.01)

(58) Field of Classification Search
CPC .......... B60N 2002/0272; B60N 2/0705; B60N 2/0702; B60N 2/0715; B60N 2/072; B60N 2/07; B60R 21/01554
See application file for complete search history.

(56) References Cited

U.S. PATENT DOCUMENTS

| | | | | |
|---|---|---|---|---|
| 6,053,529 A * | 4/2000 | Frusti | ..................... | B60N 2/002 248/429 |
| 6,095,555 A * | 8/2000 | Becker | ................. | B60N 2/0224 280/735 |
| 6,275,026 B1 * | 8/2001 | Becker | .............. | B60R 21/01554 280/735 |
| 6,593,735 B2 * | 7/2003 | Becker | ................. | B60N 2/0224 280/735 |
| 6,683,544 B2 * | 1/2004 | Tokunaga | .............. | B60N 2/002 280/735 |

(Continued)

FOREIGN PATENT DOCUMENTS

| | | | | |
|---|---|---|---|---|
| DE | 102005011262 A1 * | 9/2006 | .......... | B60N 2/0705 |
| DE | 10361028 B4 * | 4/2009 | .......... | B60N 2/0232 |

(Continued)

*Primary Examiner* — Eret C McNichols
(74) *Attorney, Agent, or Firm* — Oliff PLC

(57) ABSTRACT

A seat sliding mechanism includes a lower rail, an upper rail, a position sensor and a sensor bracket. The lower rail is provided on a side of a vehicle floor. The upper rail is provided at a lower part of a seat body and is slidably supported by the lower rail along front and rear directions. The position sensor is provided on the upper rail and detects a position along front and rear directions. The sensor bracket is provided on the lower rail and its proximity state to the position sensor is to be detected. The sensor bracket includes a base, a detected portion and a supporting portion. The base is fixed to a bottom of the lower rail. The detected portion is detected by the position sensor. The supporting portion supports the detected portion.

15 Claims, 6 Drawing Sheets

(56) References Cited

U.S. PATENT DOCUMENTS

| | | | | |
|---|---|---|---|---|
| 6,774,625 B2* | 8/2004 | Suzuki | B60N 2/0224 | 324/207.2 |
| 6,798,196 B2* | 9/2004 | Kojima | B60N 2/0224 | 324/207.26 |
| 6,851,655 B2* | 2/2005 | Kume | B60N 2/0224 | 248/424 |
| 6,921,107 B2* | 7/2005 | Mills | B60N 2/0224 | 280/735 |
| 6,935,692 B2* | 8/2005 | Nishide | B60N 2/002 | 248/429 |
| 7,564,234 B2* | 7/2009 | Endoh | B60N 2/0232 | 296/65.13 |
| 8,810,240 B2* | 8/2014 | Nishide | B60N 2/067 | 324/207.24 |
| 8,985,542 B2* | 3/2015 | Diemer | B60N 2/07 | 248/429 |
| 9,067,513 B2* | 6/2015 | Ozawa | B60N 2/067 | |
| 9,550,502 B2* | 1/2017 | Kitou | B60N 2/07 | |
| 2004/0251723 A1* | 12/2004 | Endo | B60N 2/071 | 297/284.1 |
| 2005/0099175 A1* | 5/2005 | Barnabo | B60N 2/002 | 324/207.2 |
| 2011/0101970 A1* | 5/2011 | Lanter | G01B 7/003 | 324/207.25 |
| 2012/0073369 A1* | 3/2012 | Suzuki | G01D 5/145 | 73/431 |
| 2014/0167742 A1* | 6/2014 | Moore | G01R 33/0088 | 324/207.2 |
| 2017/0067761 A1* | 3/2017 | Kito | G01D 11/30 | |

FOREIGN PATENT DOCUMENTS

| | | | | |
|---|---|---|---|---|
| DE | 102013213798 A1 * | 1/2015 | | B60N 2/0705 |
| DE | 102015216164 A1 * | 3/2016 | | B60N 2/07 |
| JP | 2004-0161090 A | 6/2004 | | |
| KR | 1020070047416 B1 * | 3/2008 | | |
| WO | WO 2014093763 A1 * | 6/2014 | | G01R 33/0088 |

* cited by examiner

SEAT SLIDING MECHANISM

TECHNICAL FIELD

The present invention relates to a seat sliding mechanism which slidably supports a seat body in front and rear directions in a vehicle.

BACKGROUND ART

A vehicle seat is set in a vehicle slidably in front and rear directions by a sliding mechanism. With respect to a seat sliding mechanism set at driver's seat, a position sensor which detects the position of a seat body (such as a seat and a sheet back) along front and rear directions can be provided in order to control the operation of an air bag module provided in a steering wheel.

The position sensor is supported by a bracket which extends laterally from a lower rail provided on the side of a vehicle floor. An upper rail is provided on the side of the seat body. The position sensor detects the position of the seat body depending on whether a detected portion fixately provided on the side surface of the upper rail is positioned opposite to the detection portion of the position sensor (refer to Patent Document 1).

PRIOR ART DOCUMENT

Patent Document

Patent Document 1: JP 2004-161090 A

SUMMARY OF INVENTION

Problem to be Solved by the Invention

However, in a conventional sliding mechanism, the position sensor extends along the direction orthogonal to slide rails (left and right directions). Thus, in a case where a range for attaching a bracket is small, such as a case where another member is provided on the upper rail, there is a problem that a relative arrangement of the position sensor and the detected portion composed of a plate to be detected tends to be restricted.

For example, foot brackets are provided at the front and rear ends of the lower rail. It is necessary to arrange the bracket for supporting a position sensor or a detected portion so as to avoid the foot brackets, and thus, it is difficult to detect the seat body which moves more forward or more rearward.

The supporting structure for detecting a position such as a position sensor is required to be provided with relative arrangement thereof being accurate. However, if the supporting strength of the bracket is not sufficiently high, it tends to be influenced by a deflection, for example, resulting in low detection accuracy. However, in conventional sliding mechanism, the supporting structure of a bracket is not sufficiently considered.

An object of the present invention is to provide a sliding mechanism which reduces the restriction of the detection range of a seat.

Means for Solving the Problem

The invention according to claim 1 is a seat sliding mechanism including:
a lower rail which is provided on a side of a vehicle floor;
an upper rail which is provided at a lower part of a seat body and which is slidably supported by the lower rail along front and rear directions;
a position sensor which is provided on the upper rail and which detects a position along front and rear directions; and
a sensor bracket which is provided on the lower rail and whose proximity state to the position sensor is to be detected,
wherein the sensor bracket includes:
a base which is fixed to a bottom of the lower rail;
a detected portion which is detected by the position sensor; and
a supporting portion which supports the detected portion at an obliquely upward and forward position or an obliquely upward and rearward position with respect to the base.

The invention according to claim 2 is the seat sliding mechanism according to claim 1, wherein
the position sensor includes a detection portion which detects the detected portion of the sensor bracket which is to be positioned below the detection portion, and
the supporting portion has a shape having a downward cut out at a part nearer to the base from an end of the detected portion nearer to the base.

The invention according to claim 3 is the seat sliding mechanism according to claim 1, wherein
the supporting portion has a shape having a cut out extending vertically downward with respect to the detected portion from the end of the detected portion nearer to the base.

The invention according to claim 4 is the seat sliding mechanism according to claim 1, wherein
a bead is formed on the supporting portion.

The invention according to claim 5 is the seat sliding mechanism according to claim 4, wherein
the bead is formed so as to extend from the base along a direction toward the detected portion.

The invention according to claim 6 is the seat sliding mechanism according to claim 1, wherein
the base includes a flange formed at a front end or a rear end thereof.

The invention according to claim 7 is the seat sliding mechanism according to claim 6, wherein
the base has a fixing hole for being fixed to the lower rail, and
the flange is formed in a range including a portion of the fixing hole on a side of the supporting portion when seen along front and rear directions.

The invention according to claim 8 is the seat sliding mechanism according to claim 6, wherein
the bead formed on the supporting portion and the flange formed on the base are formed so as to overlap with each other when seen along front and rear directions.

The invention according to claim 9 is the seat sliding mechanism according to claim 1, wherein
the sensor bracket is provided on the lower rail such that the detected portion is higher than the lower rail.

Effects of the Invention

In the invention according to claim 1, since the supporting portion of the sensor bracket supports the detected portion at an obliquely upward and forward position or an obliquely upward and rearward position with respect to the base, improving the degree of freedom for attaching the sensor bracket is possible. Even if a component such as a foot bracket is provided on the lower rail and the attachment position of the base is restricted to rearward (or forward), the detected portion can be arranged more forward (or more rearward) and a wide range detection of the move of the upper rail along front and rear directions is possible.

In the invention according to claim 2, since the supporting portion of the sensor bracket has a shape having a downward cut out at a part nearer to the base from an end of the detected portion nearer to the base, when a detection is carried out by the position sensor, falsely detecting the supporting portion as the detecting portion can be reduced and avoided, and improving the detection accuracy is possible.

In the invention according to claim 3, the supporting portion of the sensor bracket has a shape having a vertically downward cut out with respect to the detected portion from the end of the detected portion nearer to the base, when the detection portion of the position sensor detects the detected portion, reducing the false detection of the supporting portion can be further reduced and further improving the detection accuracy is possible.

In the invention according to claim 4, since the bead is formed on the supporting portion of the sensor bracket, reducing the influence of the deflection of the supporting portion and improving the detection accuracy of the position sensor are possible.

In the invention according to claim 5, since the bead on the supporting portion is formed so as to extend from the base toward the detected portion, further reducing the deflection of the supporting portion is possible.

In the invention according to claim 6, since the flange is formed at the front end or the rear end of the base, improving the rigidity of the base and improving the detection accuracy of the position sensor by reducing the influence of the deflection of the base are possible.

In the invention according to claim 7, since the flange is formed in a range including a portion of the fixing hole on the side of the supporting portion where load tends to concentrate, enhancing the rigidity of the base more effectively and further improving the detection accuracy of the position sensor are possible.

In the invention according to claim 8, since the bead on the supporting portion and the flange on the base are formed so as to overlap with each other when seen along front and rear directions, and there is no gap between the range where the rigidity is improved by the bead and the range where the rigidity is improved by the flange, the concentration of stress in the base and the supporting portion occurs less easily and further improving the detection accuracy of the detection portion is possible by reducing the influence of the deflection.

In the invention according to claim 9, since the sensor bracket is provided on the lower rail such that the detected portion is higher than the lower rail, arranging the detected portion closer to the position sensor in comparison to the lower rail is possible, whereby the more accurate detection of the detected portion is possible by reducing the influence of the lower rail.

BRIEF DESCRIPTION OF THE DRAWINGS

The present invention is fully understood from the detailed description given hereafter and the accompanying drawings, which are given by way of illustration only and thus are not intended to limit the present invention, wherein.

DESCRIPTION OF PREFERRED EMBODIMENT

Hereinafter, an embodiment of the present invention will be described with reference to the drawings. Though various technical limitations which are preferable to carry out the present invention are added to the embodiment described below, the scope of the invention is not limited to the following embodiment and the illustrated examples.

In the present embodiment, a seat sliding mechanism 10 provided at a driver's seat on a vehicle floor in a vehicle is described as an example.

In the following explanation, up, down, left, right, front and rear directions of the seat sliding mechanism 10 are defined as up, down, left, right, front and rear directions seen from an occupant seated on a seat body supported by the seat sliding mechanism 10.

[Overview of Seat Sliding Mechanism]

Figure 1:
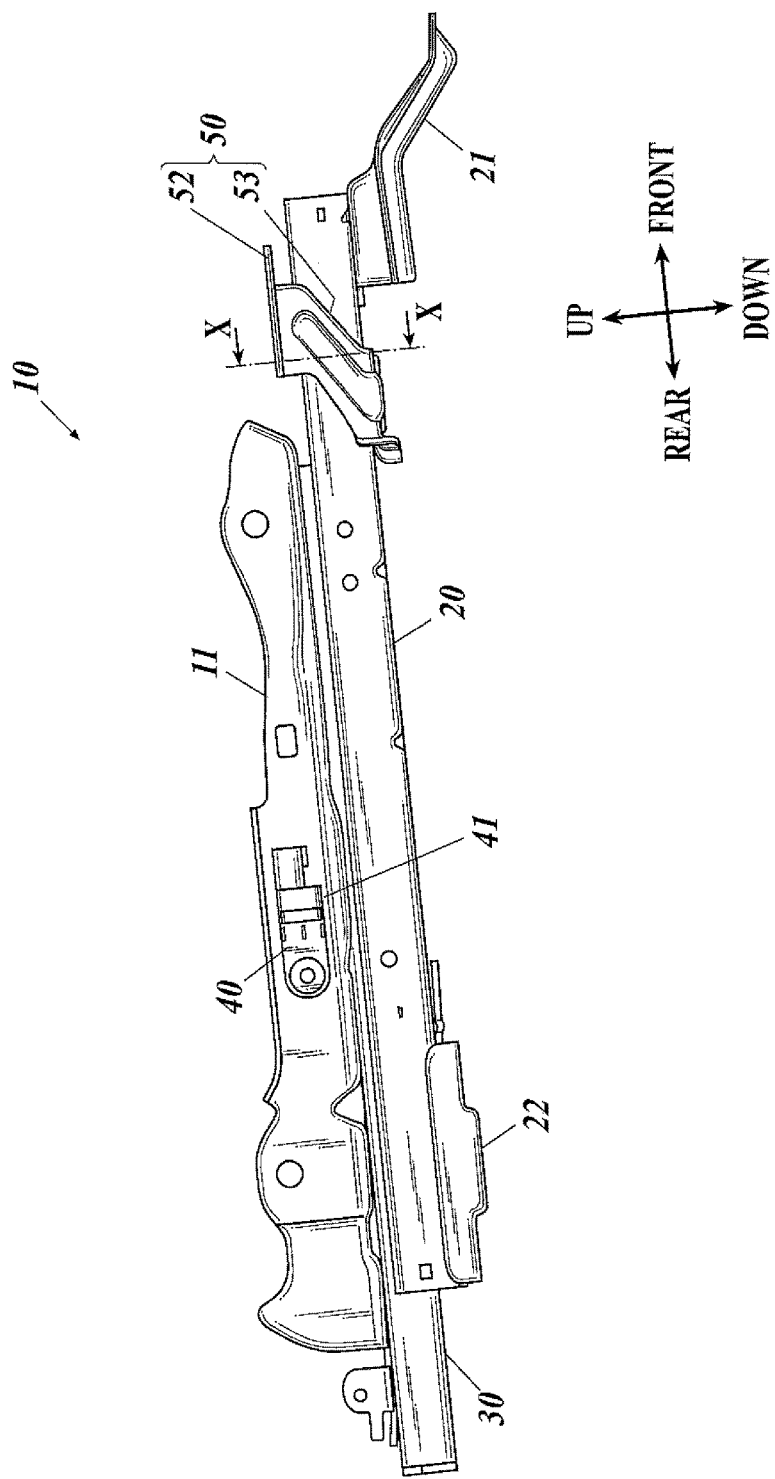
FIG. 1 is a side view of a seat sliding mechanism.
Figure 2:
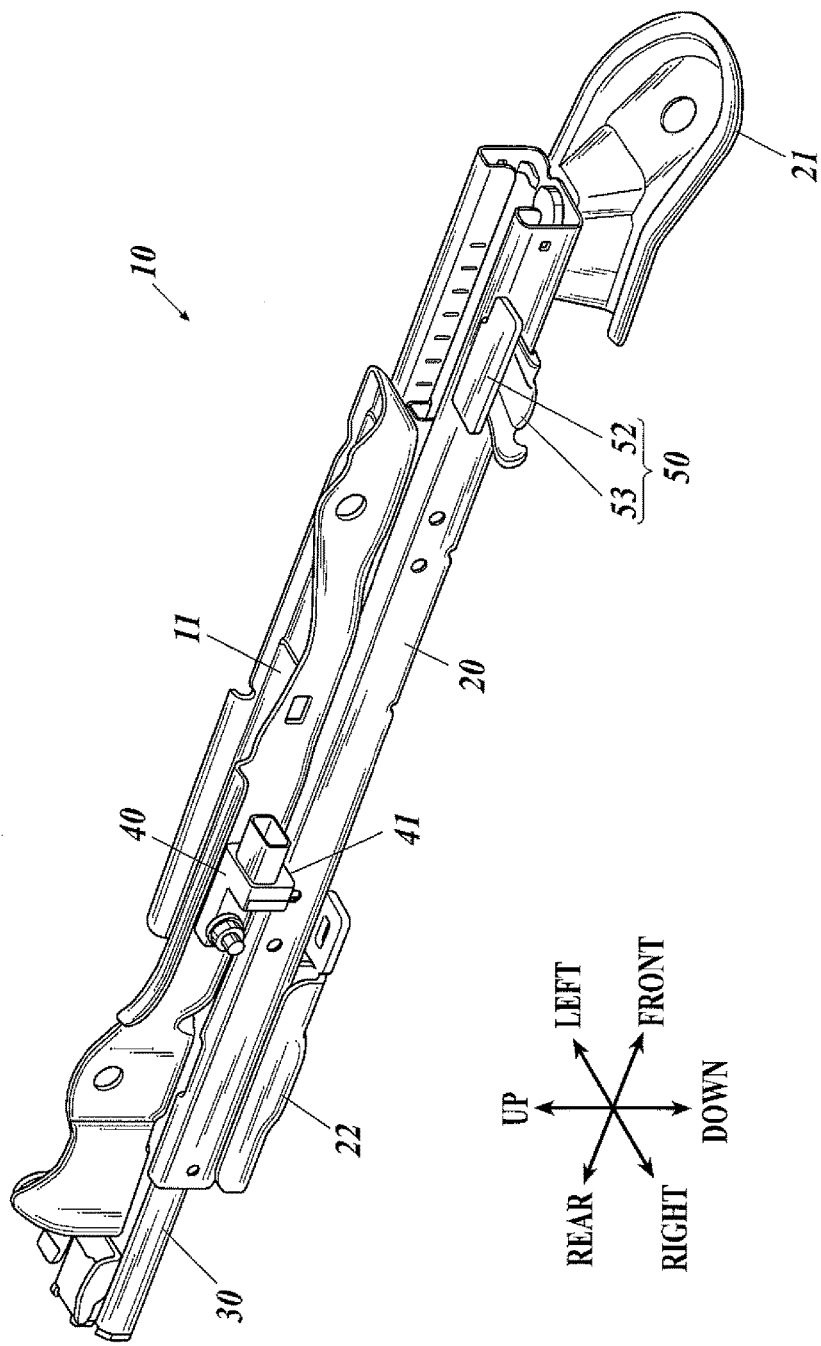
FIG. 2 is a perspective view of the seat sliding mechanism.
Figure 3:
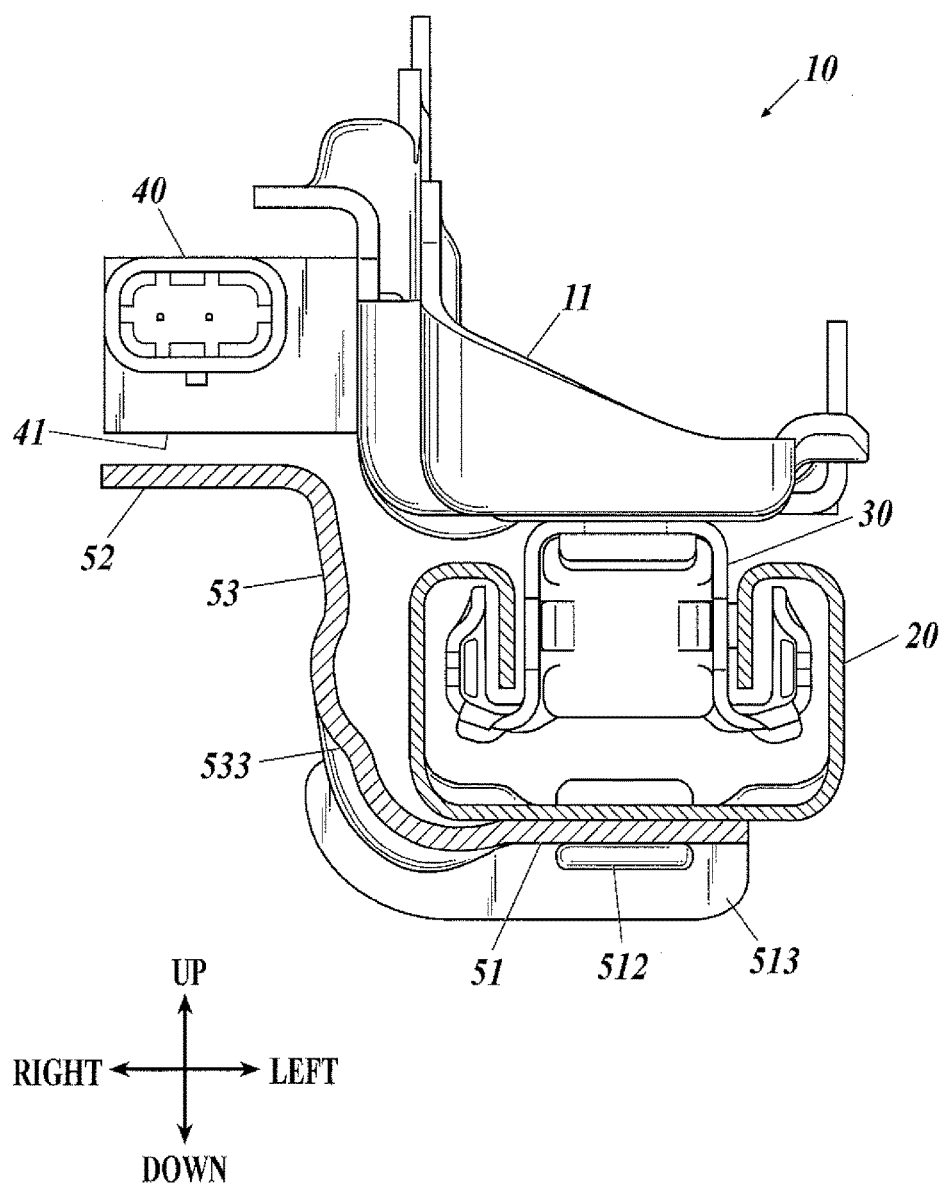
FIG. 3 is a cross-sectional view taken through X-X line of FIG. 1.

FIG. 1 is a side view of the seat sliding mechanism 10. FIG. 2 is a perspective view of the seat sliding mechanism 10. FIG. 3 is a cross-sectional view taken through X-X line in FIG. 1.

The seat sliding mechanism 10 includes a lower rail 20 provided on a side of the vehicle floor, an upper rail 30 which is provided at a lower part of the seat body (not shown) and which is slidably supported by the lower rail 20 along front and rear directions, a position sensor 40 which is provided on the upper rail 30 and which detects a position along front and rear directions, and a sensor bracket 50 which is provided on the lower rail 20 and whose proximity state with respect to the position sensor 40 is detected.

The seat body includes a seat back frame, left and right cushion side frames provided below the seat back frame and left and right base frames 11 respectively provided on lower sides of the left and right cushion side frames. Since the configurations of these components are similar to well-known configurations, a detailed explanation will be omitted.

Each structural component of the seat body and the seat sliding mechanism 10 is mainly formed of antirust metal (for example, stainless steel) except the position sensor 40.

The left and right lower rails 20 are provided on a lower side of the seat body. Since the left and right lower rails 20 are symmetric along left and right directions, only the right lower rail 20 will be shown and the right rail 20 will be mainly explained.

The lower rail 20 is composed of a bottom plate which is elongated along front and rear directions and side wall portions which erect from left and right ends of the bottom plate. The lower rail 20 is a metal rail which is substantially U shaped seen from front. The lower rail 20 accommodates the upper rail 30 inside and slidably supports the upper rail 30 along a longitudinal direction thereof. Upper ends of the left and right side wall portions of the lower rails 20 are bent downward toward inside forming a bent portion to prevent the upper rail 30 accommodated inside from detaching upward.

The bottom of a front end and the bottom of a rear end of the lower rail 20 are respectively provided with foot brackets 21, 22. The lower rail 20 is fixed onto the vehicle floor through the foot brackets 21, 22. The front foot bracket 21 is a little higher than the rear foot bracket 22, and thus, the lower rail 20 is inclined downward toward the rear direction.

The sensor bracket 50 is attached to only the right lower rail 20 on the right side just behind the front foot bracket 21.

The upper rail 30 is composed of a top plate which is elongated along front and rear directions and side wall portions which extend downward from the left and right ends of the top plate. The upper rail 30 is a metal rail which has an inverted U shape seen from front. The lower ends of the left and right side wall portions of the upper rail 30 are bent upward from outside and engage with the inward bent portion of the left and right side wall portions of the lower rail 20 described above.

A base frame 11 is connected fixatedly to an upper surface of the top plate of the upper rail 30.

The position sensor 40 is a sensor which includes a Hall element therein and which detects an approach of the sensor bracket 50 which is composed of a magnetic body. The entire circumference of the Hall element is surrounded by a wall blocking magnetism except a detection portion 41 of the position sensor 40, and thus, the downward directional characteristics of the detection portion 41 is enhanced.

That is, only when the magnetic body approaches to a position vertically downward of the detection portion 41 and faces the detection portion 41, the approach of the magnetic body can be detected. When the magnetic body is out of an area facing a surface of the detection portion 41, the magnetic body is in an undetected state.

The position sensor 40 is supported by the upper rail 30 through the base frame 11. That is, the position sensor 40 is fixed and supported by the right surface of the base frame 11, and the detection portion 41 is positioned rightward in comparison to the right surface of the lower rail 20.

[Sensor Bracket]

Figure 4:
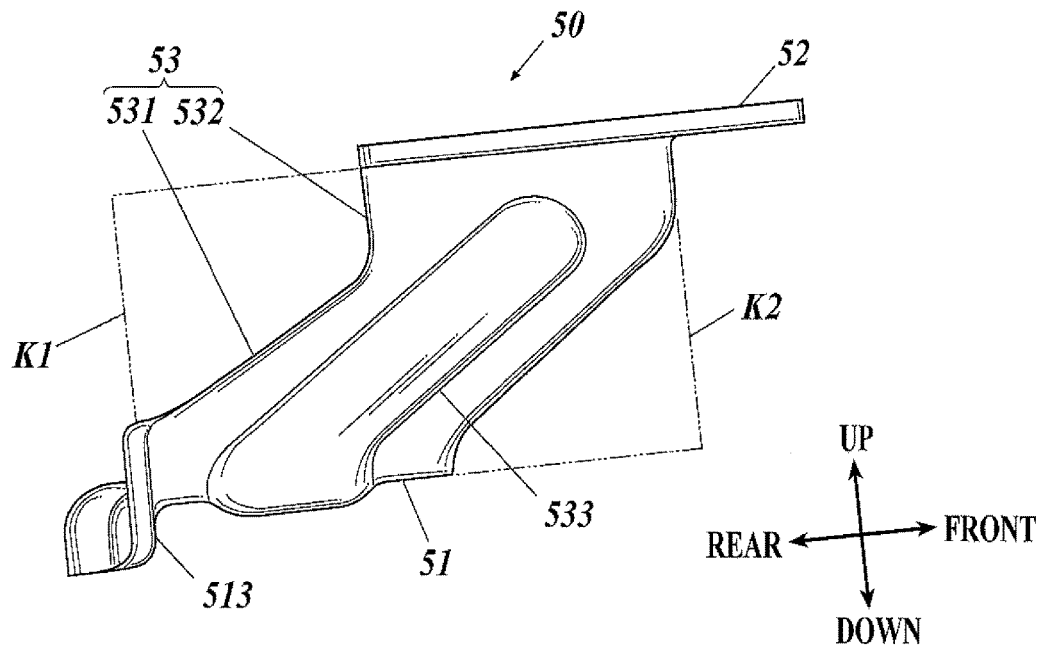
FIG. 4 is a side view of a sensor bracket seen from right.
Figure 5:
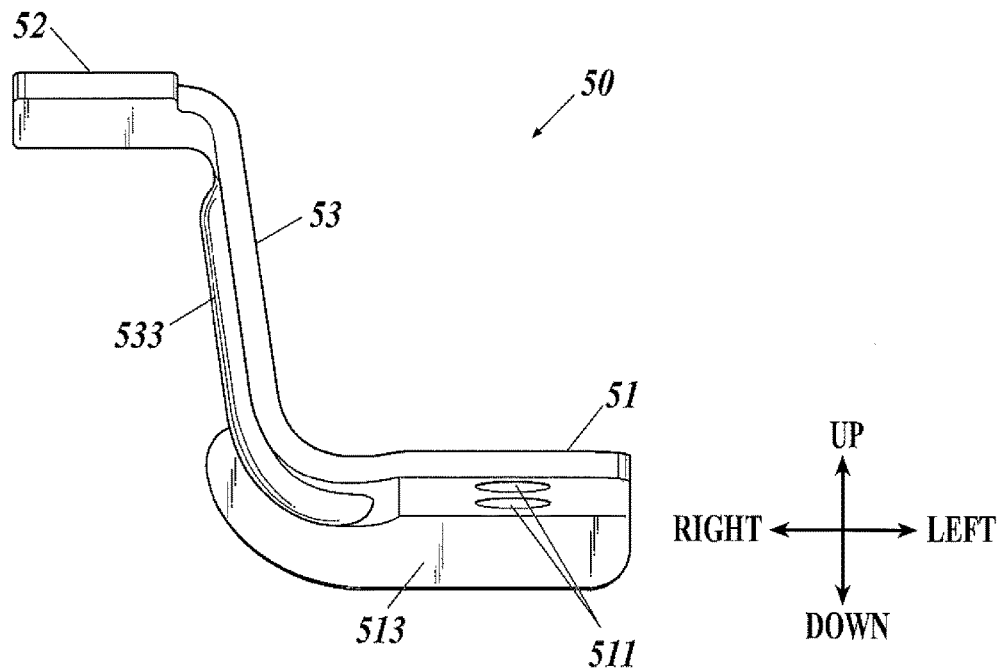
FIG. 5 is a view of the sensor bracket seen from substantially front.
Figure 6:
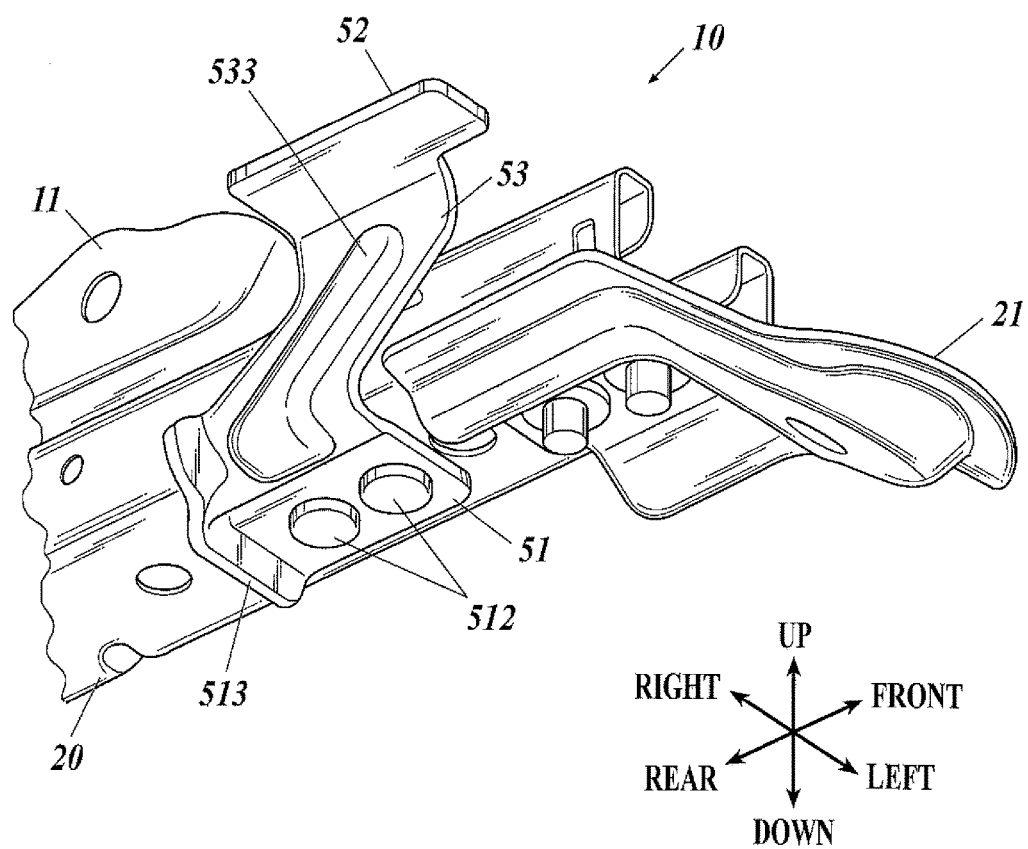
FIG. 6 is a perspective view of the sensor bracket seen from right obliquely downward.
Figure 7:
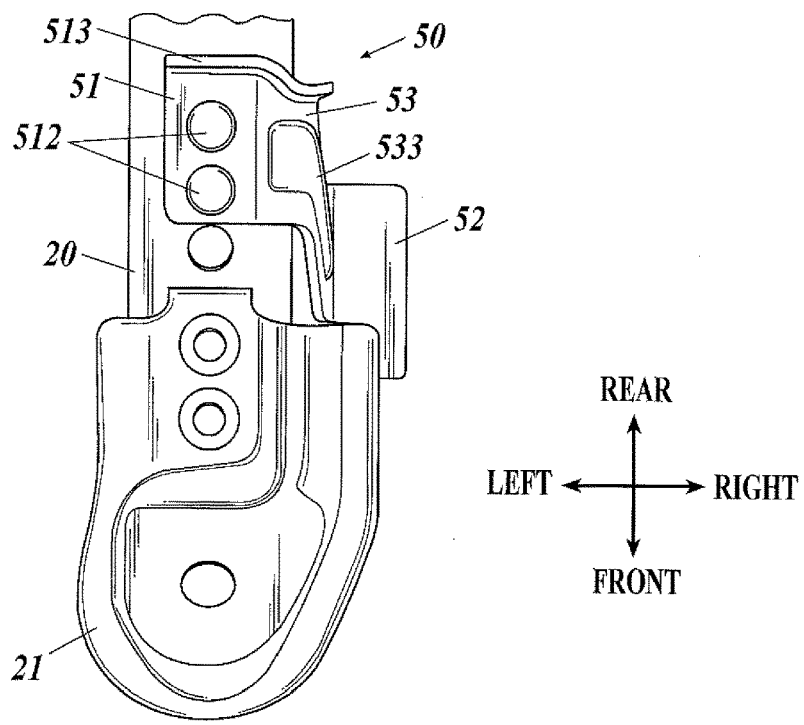
FIG. 7 is a bottom view of the sensor bracket.
Figure 8:
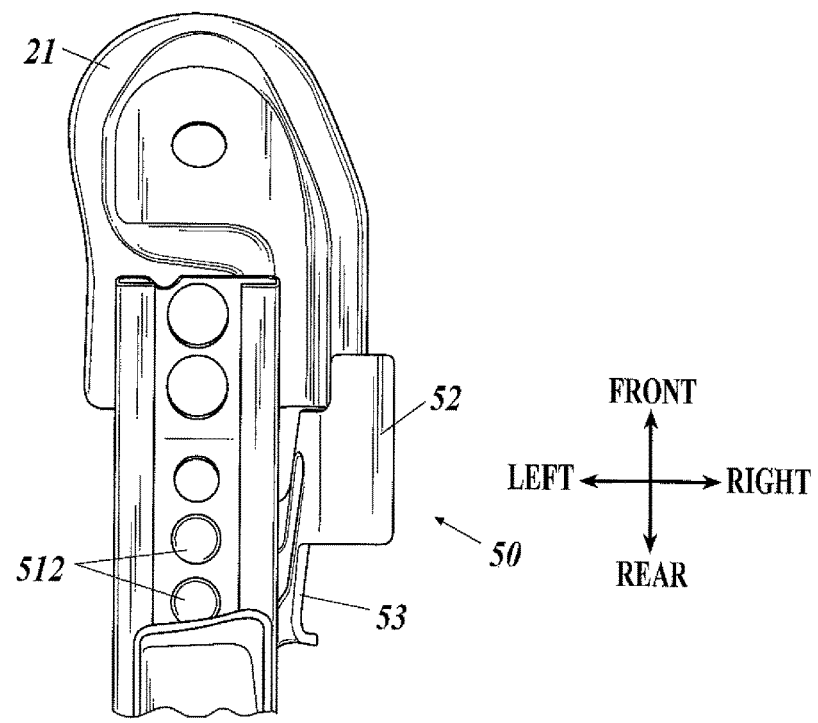
FIG. 8 is a plan view of the sensor bracket.

FIG. 4 is a right side view of the sensor bracket 50. FIG. 5 is a view of the sensor bracket 50 seen substantially from front. FIG. 6 is a perspective view of the sensor bracket 50 seen from right obliquely downward. FIG. 7 is a bottom view of the sensor bracket 50. FIG. 8 is a plan view of the sensor bracket 50.

The sensor bracket 50 includes a base 51 fixed to the bottom of the lower rail 20, a detected portion 52 which is to be detected by the position sensor 40, and a supporting portion 53 which supports the detected portion 52 at a obliquely upward and forward position with respect to the base 51. Each of these portions is formed by bending or pressing one sheet of magnetic metal.

The base 51 is a flat plate extending along front and rear directions and left and right directions, and the upper surface of the base 51 is tightly fixed to the lower surface of the bottom plate of the lower rail 20. As shown in FIG. 5, two fixing holes 511, 511 are formed next to each other along front and rear directions in the middle of left and right directions of the base 51. The base 51 is fixed to the lower rail 20 by inserting rivets 512, 512 through the fixing holes 511, 511.

A flange 513 which extends downward is formed at the rear end of the base 51. The flange 513 will be descried later.

The detected portion 52 is a flat plate having a rectangle shape which is longer along front and rear directions. The detected portion 52 extends rightward from the upper end of the supporting portion 53. The detected portion 52 has edges along front and rear directions parallel to each other and edges along left and right directions parallel to each other. The detected portion 52 is supported by the supporting portion 53 at a position higher than the upper end of the lower rail 20.

As shown in FIG. 3, when seen from front, the detected portion 52 thereby is arranged so as to be close to the detection portion 41 of the position sensor 40 which is attached to the right side of the base frame 11 along up and down directions and along left and right directions.

The detected portion 52 is arranged with respect to the lower rail 20 such that the detected portion 52 enters the detection range of the detection portion 41 of the position sensor 40 when the upper rail 30 moves near to the foremost position of the movable range of the upper rail 30.

The supporting portion 53 is a flat plate which is continued from the right end of the base 51 and which is raised upward from the base 51. The upper end of the supporting portion 53 is continued to the detected portion 52. As shown in FIG. 5, the supporting portion 53 has the upper end which is slightly inclined rightward.

As shown in FIG. 4, seen from right, the supporting portion 53 has a shape of a rectangle which is longer along front and rear directions and which is partly cut out. That is, the supporting portion 53 has a shape which has a downward cut out at an upper portion rearward from the detected portion 52 and which has an upward cut out at a lower portion frontward from the base 51. Although the supporting portion 53 has a shape which has a cut out, the supporting portion 53 is not necessarily formed by cutting out. References K1 and K2 in FIG. 4 show the shapes of portions corresponding to cut out portions.

Furthermore, the supporting portion 53 has a shape having a vertically downward cut out with respect to the detected portion 52 from the rear end of the detected portion 52.

As described above, the supporting portion 53 has a shape having cutting outs at several parts. Thus, the supporting portion 53 has an oblique portion 531 which extends from the base 51 toward the detected portion 52, and a vertical portion 532 which extends from the upper end of the oblique portion 531 vertically upward.

The rear end of the vertical portion 532 and the rear end of the detected portion 52 have the same position along front and rear directions.

Thus, when the detected portion 52 located at the upper end of the supporting portion 53 is detected by the position sensor 40, preventing the supporting portion 53 formed of magnetic body from being falsely detected is possible because the supporting portion 53 has a shape which does not include a part close to the detection portion 41 of the position sensor 40 on a forward side of the front end of the detected portion 52 and on a rearward side of the rear end of the detected portion 52.

The supporting portion 53 is provided with a bead 533 extending along an extending direction of the oblique portion 531 and being formed so as to be convex toward outside (an opposite side from the lower rail 20). The bead is a convex reinforcement structure which is formed to bulge on one side.

The bead 533 extends from the proximity of the upper end of the supporting portion 53 beyond a boundary portion between the supporting portion 53 and the base 51 slightly extending to the base 51, whereby the rigidity of the supporting portion 51 and the rigidity of the boundary portion between the supporting portion 53 and the base 51 are enhanced.

In addition, as described above, the flange 513 is formed at the rear end of the base 51. The flange 513 is formed along the entire width of the base 51 in left and right directions and is also formed beyond the boundary between the supporting portion 53 and the base 51 extending to the supporting portion 53 to some extent.

Therefore, when seen along front and rear directions, a range where the bead 533 is formed and a range where the flange 513 is formed are overlapped with each other. Since there is not a gap between the range where the rigidity is enhanced by the flange 513 and the range where the rigidity is enhanced by the bead 533, the rigidity of the base 51 and supporting portion 53 can be enhanced entirely.

As described above, the flange 513 is formed along the entire width of the base 51 in left and right directions. The base 51 is fixed to the lower rail 20 by inserting fasteners such as rivets through fixing holes 511. In a case where such a fixing structure is adopted, the head of the rivet abuts the fixing hole 511 on the side of the supporting portion 53, and thus, stress tends to concentrate thereto.

On the other hand, the flange 513 is formed in the range along left and right directions so as to include portions of the fixing holes 511 on the side of the supporting portion 53. Since the rigidity of the portion which tends to deflect due to the concentration of stress is enhanced, the deflection which occurs at the base 51 can be effectively reduced.

Technical Effects of Embodiment

As described above, in the seat sliding mechanism 10, since the supporting portion 53 of the sensor bracket 50 supports the detected portion 52 at obliquely upward and forward position with respect to the base 51, improving the degree of freedom for attaching the sensor bracket 50 is possible. For example, since the foot bracket 21 is provided at the front end of the lower rail 20, the base 51 of the sensor bracket 50 cannot be attached to the foremost side of the lower rail 20. However, as shown in FIGS. 7 and 8, the detected portion 52 can be arranged forwardly at least with respect to the rear end of the foot bracket 21.

Therefore, even if the attachment position of the base 51 is restricted, detecting the state where the seat body is moved more forwardly is possible, and thus, the degree of freedom for attaching the detected portion 52 of the sensor bracket 50 can be improved.

Since the supporting portion 53 of the sensor bracket 50 has a shape which has a downward cut out at the portion rearward with respect to the detected portion 52, the portion of the supporting portion 53 which is rearward with respect to the detected portion 52 can be made distant from the detection portion 41 of the position sensor 40. Thus, even if the entire sensor bracket 50 is formed integrally with the same material, reducing or avoiding falsely detecting the supporting portion 53 as the detected portion 52 is possible and improving the detection accuracy is possible.

In particular, since the supporting portion 53 has a shape which has a vertically downward cut out from the rear end of the detected portion 52 with respect to the detected portion 52 and has the vertical portion 532, further reducing the false detection of the supporting portion 53 by the position sensor 40 is possible and further improving the detection accuracy is possible.

Since the bead 533 is formed on the supporting portion 53 of the sensor bracket 50 and the bead 533 is formed so as to extend from the base 51 toward the detected portion 52, reducing the deflection of the supporting portion 53 is possible more effectively.

The flange 513 is formed at the rear end of the base 51 of the sensor bracket 50. The flange 513 is formed in the range including the portion of the fixing hole 511 on the side nearer to the supporting portion 53 where the concentration of load tends to occur. Thus, enhancing the rigidity of the base 51 more effectively, reducing the influence of the deflection of the base 51 and improving the detection accuracy of the position sensor 40 are possible.

Since the bead 533 on the supporting portion 53 of the sensor bracket 50 and the flange 513 of the base 51 are formed so as to overlap with each other seen along front and rear directions, enhance the entire rigidity from the base 51 to the supporting portion 53 is possible, and further improving the detection accuracy of the position sensor 40 is possible.

Since the sensor bracket 50 is provided on the lower rail 20 such that the detected portion 52 is positioned higher than the upper end of the lower rail 20, arranging the detected portion 20 nearer to the position sensor 40 in comparison to the lower rail 20 is possible. Reducing the influence of false detection and carrying out the detection by the position sensor 40 more accurately are possible.

[Other]

The flange 513 described above is formed not necessarily at the rear end of the base 51, but may be formed at the front end of the base 51.

The position sensor 40 is not limited to a type which detects magnetism, but another sensor which can detect the detected portion may be used.

The arrangement of each component of the seat sliding mechanism 10 may be changed as needed. For example, the sensor bracket 50 and the position sensor 40 are respectively arranged on the right side of the lower rail 20 and the upper rail 30. However, the sensor bracket 50 and the position sensor 40 may be respectively arranged on the left side of the lower rail 20 and the upper rail 30. The sensor bracket 50 and the position sensor 40 are respectively provided on the left lower rail 20 and the left upper rail 30.

The position sensor 40 is provided at the upper rail 30 through the base frame 11. However, the position sensor 40 may directly attached to the upper rail 30. The position sensor 40 may be attached through another member which moves along front and rear directions with the upper rail 30. The member to which the position sensor 40 is attached is not limited to the base frame 11.

The supporting portion 53 of the sensor bracket 50 may extend obliquely upward and rearward instead of obliquely upward and forward. This configuration can correspond to the demand to carry out detection by arranging the supporting portion 53 rearward with respect to the base 51.

In this case, the supporting portion 53 preferably has a downward cut out at a part nearer to the base (front side) from an end (front end) of the detected portion 52 on the side of the base 51, and the supporting portion 52 more preferably has a shape having a cutout extending vertically downward with respect to the detected portion 52 from the end (front end) of the detected portion 52 on the side of the base 51.

DESCRIPTION OF REFERENCE NUMERALS 10 seat sliding mechanism
11 base frame
20 lower rail
21, 22 foot bracket
30 upper rail
40 position sensor 41 detection portion
50 sensor bracket
51 base
52 detected part
53 supporting portion
511 fixing hole
512 rivet
513 flange
531 oblique portion
532 vertical portion
533 bead

The invention claimed is:

1. A seat sliding mechanism comprising:
a lower rail which is provided on a side of a vehicle floor;
an upper rail which is provided at a lower part of a seat body and which is slidably supported by the lower rail along front and rear directions;
a position sensor which is provided at the upper rail and which detects a position along the front and rear directions; and
a sensor bracket which is provided at the lower rail and whose proximity state to the position sensor is to be detected,
wherein the sensor bracket includes:
a base which is fixed to a bottom of the lower rail;
a detected portion which is detected by the position sensor; and
a supporting portion which extends between the base and the detected portion such that, along the front and rear directions, a rearmost end of the detected portion is forward of a rearmost end of the base, and
wherein the sensor bracket is provided at the lower rail such that the detected portion is higher than the lower rail.

2. The seat sliding mechanism according to claim 1, wherein
the position sensor includes a detection portion which detects the detected portion of the sensor bracket which is to be positioned below the detection portion, and
the supporting portion has a downward cut out at a part nearer to the base from an end of the detected portion nearer to the base.

3. The seat sliding mechanism according to claim 2, wherein
the cut out extends vertically downward with respect to the detected portion from the end of the detected portion nearer to the base.

4. The seat sliding mechanism according to claim 1, wherein
a bead is formed on the supporting portion.

5. The seat sliding mechanism according to claim 4, wherein
the bead is formed so as to extend from the base along a direction toward the detected portion.

6. The seat sliding mechanism according to claim 1, wherein
the base includes a flange formed at a front end or a rear end thereof.

7. The seat sliding mechanism according to claim 6, wherein
the base has a fixing hole for being fixed to the lower rail, and
the flange is formed on at least a portion of the front end or the rear end of the base that is at a position corresponding to a part of the fixing hole which, when seen along the front or the rear direction, is on a side of the supporting portion.

8. The seat sliding mechanism according to claim 6, wherein
a bead formed on the supporting portion and the flange formed on the base overlap with each other when seen along the front or the rear direction.

9. The seat sliding mechanism according to claim 1, wherein a frontmost end of the detected portion is forward of a frontmost end of the base.

10. The seat sliding mechanism according to claim 1, wherein the position sensor includes a detection portion that detects the detected portion of the sensor bracket and that is wider than the detected portion in left and right directions.

11. A seat sliding mechanism comprising:
a lower rail which is provided on a side of a vehicle floor;
an upper rail which is provided at a lower part of a seat body and which is slidably supported by the lower rail along front and rear directions;
a position sensor which is provided at the upper rail and which detects a position along the front and rear directions; and
a sensor bracket which is provided at the lower rail and whose proximity state to the position sensor is to be detected,
wherein the sensor bracket includes:
a base which is fixed to a bottom of the lower rail;
a detected portion which is detected by the position sensor; and
a supporting portion which extends between the base and the detected portion such that, along the front and rear directions, a rearmost end of the detected portion is forward of a rearmost end of the base, and
wherein a frontmost end of the detected portion is forward of a frontmost end of the base.

12. The seat sliding mechanism according to claim 11, wherein
the position sensor includes a detection portion which detects the detected portion of the sensor bracket which is to be positioned below the detection portion, and
the supporting portion has a downward cut out at a part nearer to the base from an end of the detected portion nearer to the base.

13. The seat sliding mechanism according to claim 11, wherein
a bead is formed on the supporting portion.

14. The seat sliding mechanism according to claim 11, wherein
the base includes a flange formed at a front end or a rear end thereof.

15. The seat sliding mechanism according to claim 11, wherein the position sensor includes a detection portion that detects the detected portion of the sensor bracket and that is wider than the detected portion in left and right directions.

* * * * *